Figure 1:
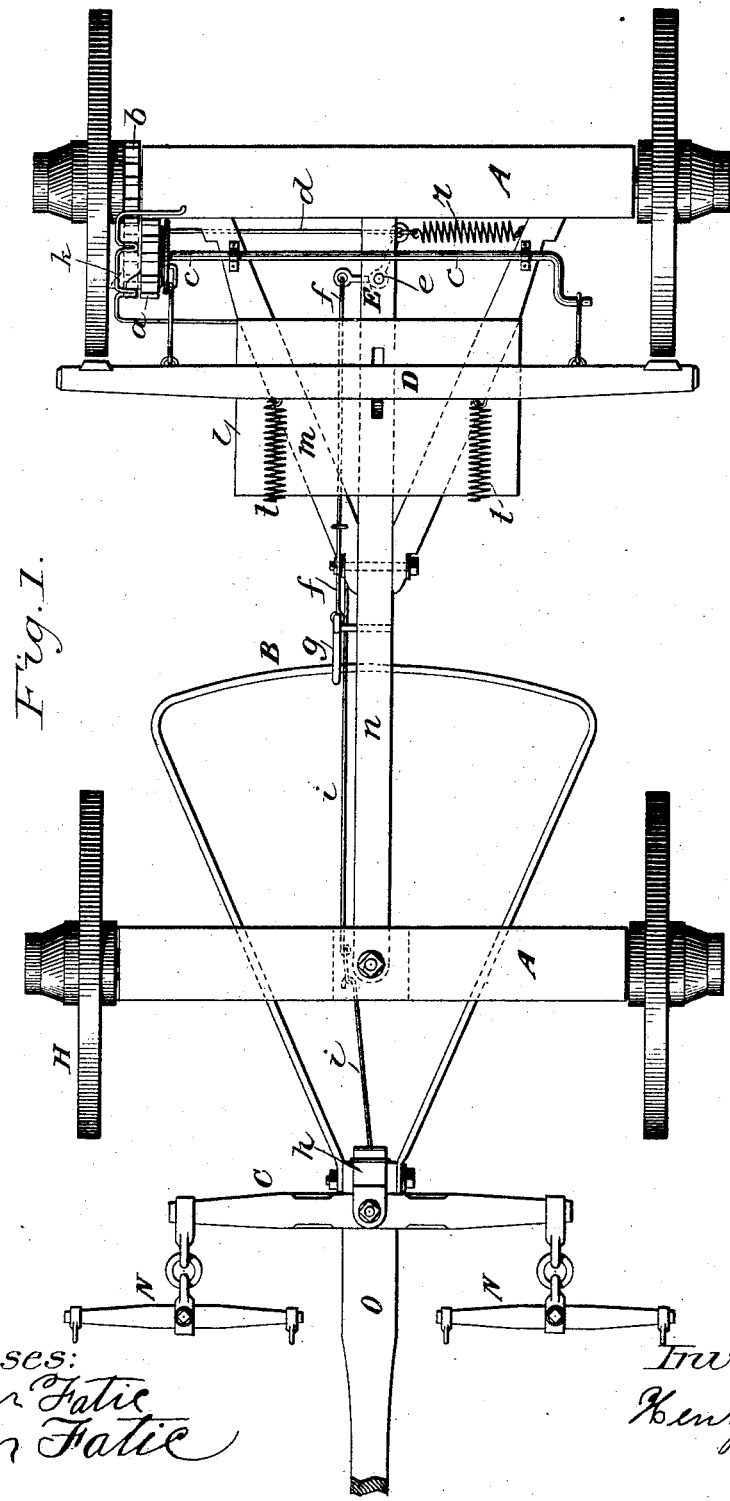

(No Model.) 2 Sheets—Sheet 1.

H. FATIC.
AUTOMATIC VEHICLE BRAKE.

No. 341,325. Patented May 4, 1886.

Witnesses:
Benton Fatic
John Fatic

Inventor:
Henry Fatic

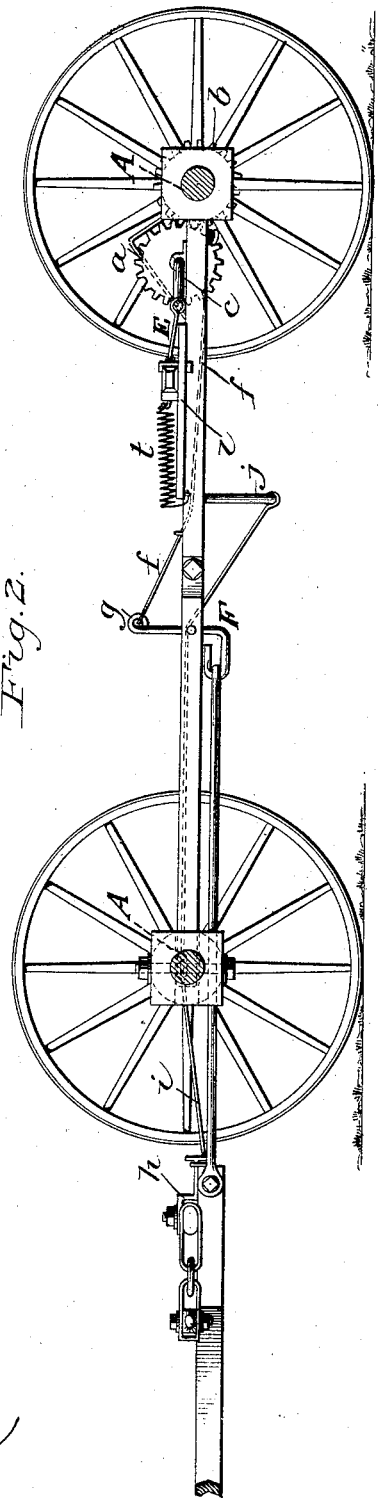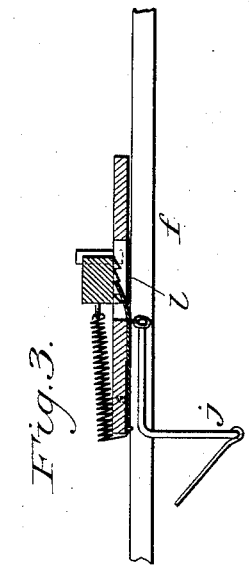

UNITED STATES PATENT OFFICE.

HENRY FATIC, OF MIDDLETOWN, INDIANA.

AUTOMATIC VEHICLE-BRAKE.

SPECIFICATION forming part of Letters Patent No. 341,325, dated May 4, 1886.

Application filed September 3, 1885. Serial No. 176,123. (No model.)

*To all whom it may concern:*

Be it known that I, HENRY FATIC, of Middletown, in the county of Henry, in the State of Indiana, have invented an Automatic Wagon-Brake, of which the following is a specification.

The invention will first be described in connection with the drawings, and then pointed out in the claims.

Figure 1 of the drawings is a plan view; Fig. 2, a longitudinal section; and Fig. 3, a detail view, partly in section.

In the drawings, A represents the axles; B, a slide bolted to the rear end of tongue O; C, a double-tree carrying single-trees N N; D, a brake-bar, and H the ground-wheels of a vehicle. I connect the brake-bar D with a crank-rod, $c$, which turns in bearings upon the rear hounds, $m$, and carries the end pinion, $a$, which slides longitudinally on rod $c$, so as to come in or out of gear with the axle-pinion $b$. Ordinarily the spring $r$ holds pinion $a$ out of gear with pinion $b$ until its tension is overcome by a greater force. To obtain the latter I connect with the rod $d$, to which the spring is attached, the elbow-lever E. This is connected by a rod, $f$, with the hook-and-eye lever F, which is attached to the slide B. When the team holds back in going downhill, the slide B is operated by the tongue, so as to throw the pinion $a$ into gear with the pinion $b$, which causes the crank-rod to be turned down. This throws the brake-bar D so as to lock the rear wheels, where it is held by a detent on the platform $l$ and a rack on the bottom of the bar D, as clearly shown in Fig. 3 of the drawings.

In order to unlock the brake, I use the bent bar $j$ and rod $i$, the latter attached to the rear end of tongue, so that as soon as the team takes a pull on the load the detent is pulled out of the rack, and the brake-bar D is carried by its retracting-springs out of contact with the wheels.

What I claim, and desire to protect by Letters Patent, is—

1. The combination of brake-bar D, provided with retracting-springs, the crank-rod $c$, the slide-pinion $a$, the axle-pinion $b$, the spring $r$, the rod $d$, the elbow-lever E, the rod $f$, the hook-and-eye lever F, and the slide B, the latter attached to the wagon-tongue, as and for the purpose described.

2. The combination, with the brake-bar D, having rack on under side, platform $l$, carrying detent, the bar $j$, and the rod $i$, the latter attached to the rear end of tongue, as and for the purpose specified.

HENRY FATIC.

Witnesses:
 JOHN T. LEIBHARDT,
 BENTON FATIC.